UNITED STATES PATENT OFFICE.

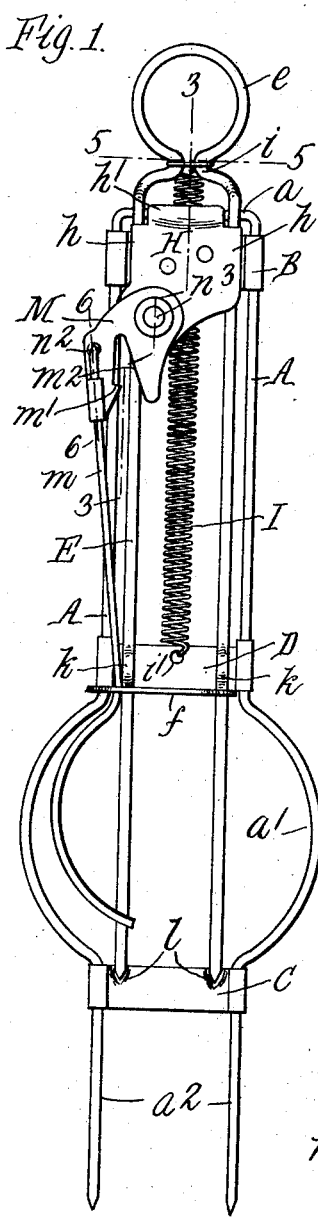
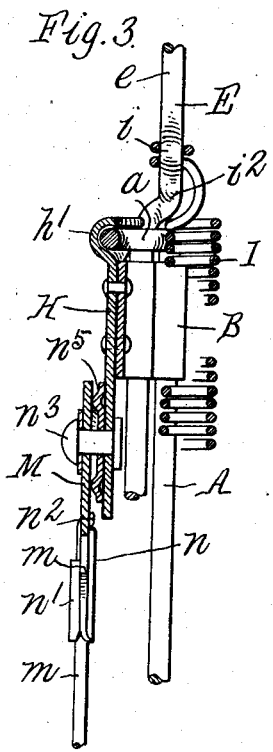
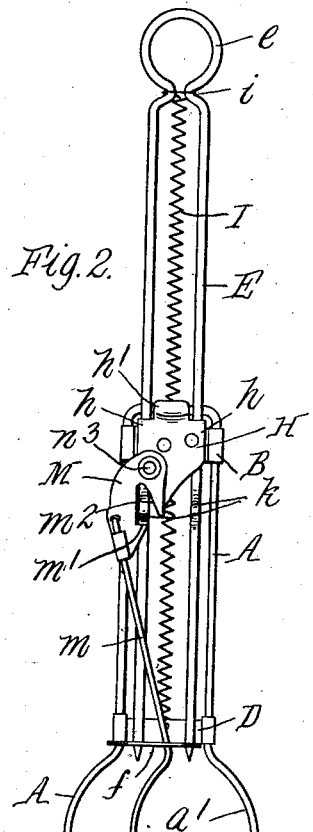
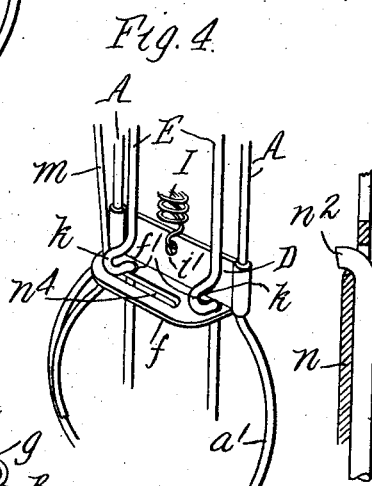
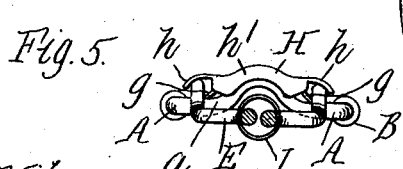

REUBEN C. ELDRIDGE, OF NIAGARA FALLS, ONTARIO, CANADA, AND JULIUS WILLERS, OF NIAGARA FALLS, NEW YORK; SAID WILLERS ASSIGNOR TO SAID ELDRIDGE.

ANIMAL-TRAP.

1,025,564.     Specification of Letters Patent.     Patented May 7, 1912.

Application filed October 27, 1909. Serial No. 524,782.

*To all whom it may concern:*

Be it known that we, REUBEN C. ELDRIDGE, a subject of the King of Great Britain, residing at Niagara Falls, in the Province of Ontario, in the Dominion of Canada, and JULIUS WILLERS, a citizen of the United States, residing at Niagara Falls, in the county of Niagara, in the State of New York, have invented a new and useful Improvement in Animal-Traps, of which the following is a specification.

This invention relates to improvements in traps of that type, intended more especially for catching gophers, squirrels, prairie dogs and other animals, which are provided with spring-actuated impaling plungers and are so placed in relation to the animal's hole, or other runway, that the animal in its passage will release the plunger and be impaled thereby.

The primary object of the invention is to produce a strong and durable trap of this sort, which will be reliable and certain in action and which is composed of wire and sheet metal parts of such construction as to enable the trap to be manufactured at small expense.

Another object is to improve the construction of these traps in the various respects hereinafter described and set forth in the claims.

In the accompanying drawings: Figure 1 is a front elevation of a trap embodying the invention. Fig. 2 is a similar view, on a reduced scale, showing the trap set. Fig. 3 is a fragmentary sectional elevation thereof, on an enlarged scale, in line 3—3, Fig. 1. Fig. 4 is a fragmentary perspective view thereof. Fig. 5 is a sectional plan thereof, on an enlarged scale, in line 5—5, Fig. 1. Fig. 6 is a section, on an enlarged scale, of the trigger in line 6—6, Fig. 1.

Like reference characters refer to like parts in the several figures.

The trap comprises a stationary frame adapted to be stuck in the ground or otherwise secured in a position such that an animal in passing will enter an opening therein, a spring-actuated impaling plunger which is slidably mounted on the frame, and a trigger which holds the plunger against movement by the spring and which, when moved by the animal entering the opening in the frame, releases the plunger which is operated by its spring to impale the animal.

The stationary frame of the trap consists of a wire which is bent to form parallel side bars A and a top cross-bar $a$, and sheet metal plates B C and D which connect the side bars respectively at the upper, lower and intermediate portions of the frame. The ends of the connecting plates are bent around the side bars A and tightly compressed thereon by a press or other means so that the plates are securely fastened to the side bars and rigidly hold them in position, thus making a very strong and rigid but light frame. The side bars A are bowed outwardly, or away from each other, between the lower and intermediate frame plates C and D to form a substantially circular opening $a'$ adapted for the entrance of the animal. The lower ends of the side bars $a^2$ are sharpened so that they can be stuck into the ground to hold the trap in position, with the opening $a'$ of the frame in the proper position relative to the hole or runway of the animal for the animal to insert its head therein.

E represents the impaling plunger which is mounted to slide vertically on the frame and consists of a wire which is bent to form two parallel bars or prongs having sharpened lower ends for impaling the animal, and a loop $e$ at the upper end of the plunger in which the finger is adapted to be inserted for pulling the plunger upwardly in setting the trap. The plunger is slidably mounted on the frame and guided in its movements by the intermediate and upper frame plates D and B. The intermediate frame plate D, see Fig. 4, has a forwardly bent flange or portion $f$ provided with guide holes $f'$ in which the lower portions of the plunger bars slide, and the upper frame plate B is offset or bowed forwardly between the side frame-bars and thus provides guide shoulders $g$, Fig. 5, against which the bars of the plunger are held so as to slide by a cap plate H which is riveted to the upper frame plate and has rearwardly bent side flanges $h$ which embrace the bars of the plunger. Guides are thus provided for the upper and lower portions of the plunger which cause it to work smoothly and freely and prevent the spreading or lateral displacement of its bars. The upper edge $h'$ of the cap plate H is preferably bent so as to embrace the top bar $a$ of the frame and it thus serves to connect the upper frame plate B and top bar, thereby materially stiffening and strengthening the upper end of the frame.

I represents the actuating spring for the impaling plunger. The spring is fastened at its upper end around a reduced portion or neck $i$ of the plunger, and at its lower end in a hole $i'$ in the intermediate frame plate, and passes in rear of the top bar $a$ and upper plate B of the frame. The plate B is bowed forwardly, as explained, and the top bar $a$ is correspondingly bowed forwardly so that the spring will work freely without contact with these parts, while the upper portion of the plunger, to which the spring is fastened, is offset rearwardly over the top of the frame, as shown at $i^2$, Fig. 3, so that the spring pulls on the plunger directly in the line of movement thereof and there is no lateral strain on the plunger tending to cause it to bind or work hard in its guides. The plunger bars are preferably formed with lateral bends or loops $k$, Figs. 1 and 4, which constitute stops that are adapted to strike the flange $f$ of the intermediate frame plate D to limit the downward movement of the plunger by its spring. The lower frame plate C is preferably provided with depressions $l$ forming pockets to receive the points of the plunger when it is down and prevent them from being bent or spread by the struggles of an empaled animal.

The trigger or detent for holding the impaling plunger in the raised or set position against action by its spring, preferably consists of a sheet metal plate M which is pivoted on the cap plate H, and a wire extension $m$ which is rigidly secured to the plate. The trigger plate is provided with a shoulder $m'$ adapted to engage the stop $k$ of one of the plunger bars to hold the plunger up, and with an inclined face $m^2$ which is engaged by the stop $k$ when the plunger is raised, whereby the trigger is moved automatically into holding relation with the stop by the raising of the plunger. The construction of the trigger to produce this automatic action is not new and the invention in so far as the trigger is concerned relates to the construction thereof and the manner of pivoting the trigger, about to be described. The trigger plate, see Fig. 6, has at one side a depression or seat $n$ in which the wire is securely held by a part $n'$ of the plate bent around the wire, and the wire has a bent end $n^2$ entering a hole in the plate which holds the wire from turning in the seat. This construction affords a very strong and rigid connection between the plate and wire. The trigger plate is pivoted to the cap plate by a rivet $n^3$ and the wire extension passes through a guide slot $n^4$ in the flange $f$ of the intermediate frame and occupies a position such that it will be engaged and moved by an animal attempting to pass through the opening $a'$ of the frame. Washers of brass or other non-rusting metal are preferably placed on the trigger pivot $n^3$ between the trigger plate and the cap plate H, and between the head of the rivet and the trigger plate so that the possible rusting of the iron parts will not interfere with the free working of the trigger, and the washer $n^5$ between the trigger and cap plate is preferably formed with an annular bead to further reduce the friction between these parts.

We claim as our invention:

1. In a trap having a sliding plunger for entrapping the animal, a frame comprising side bars, a plate connecting said side bars which is arranged with its flat faces parallel to the plane of said frame and has portions tightly embracing the side bars, said plate having a flange bent at an angle thereto and provided with guide holes in which said plunger slides, a second plate connecting said side bars, and a cap plate secured to the one face of said second connecting plate, said cap plate and second connecting plate having spaced end portions forming guides for the plunger, substantially as set forth.

2. In a trap, the combination of a frame composed of a bent wire forming side and top bars, a plate connecting said side bars adjacent to said top bar, a bent wire forming a two-prong plunger, an actuating spring for said plunger, a cap plate secured to said connecting plate and forming therewith guides for the plunger prongs, said cap plate having a portion which embraces said top bar, said top bar, connecting plate and cap plate being bowed outwardly to afford space for said spring, and a trigger for releasably holding the plunger, which is pivoted on said cap plate, substantially as set forth.

3. In a trap, the combination of a frame composed of a bent wire forming side and top bars, a plate connecting said side bars and having a flange with plunger guide holes, and a second plate connecting said side bars adjacent to said top bar, a bent wire forming a two-prong plunger which passes through said guide holes, a cap plate secured to said connecting plate which is adjacent to the top bar and forming therewith guides for the plunger prongs, said cap plate having a portion which embraces said top bar, a spring for actuating said plunger, and a trigger for releasably holding the plunger which is pivoted on said cap plate, substantially as set forth.

4. In a trap having a sliding plunger for entrapping the animal, the combination of a frame composed of a bent wire forming side and top bars, and sheet metal connecting plates arranged with their flat faces parallel to the plane of said frame and connecting said side bars, one of said plates having a flange bent at an angle thereto and provided with guide holes in which said plunger slides, said plunger consisting of a wire bent to form parallel impaling prongs and being mounted to slide on and to be guided by said connecting plates, and being provided with integral bent portions formed on each of said prongs and arranged to strike the flange of one of said connecting plates to limit the movement of the plunger, and means for releasably holding the plunger, substantially as set forth.

Witness our hands, this 19th day of October, 1909.

REUBEN C. ELDRIDGE.
  JULIUS WILLERS.

Witnesses:
  M. M. BULLOCK,
  H. B. LEACH.

---

Copies of this patent may be obtained for five cents each, by addressing the "Commissioner of Patents, Washington, D. C."